United States Patent
Stolt et al.

(10) Patent No.: US 10,972,015 B2
(45) Date of Patent: Apr. 6, 2021

(54) METHOD OF INITIATING A REGENERATIVE CONVERTER AND A REGENERATIVE CONVERTER

(71) Applicant: KONE Corporation, Helsinki (FI)

(72) Inventors: Lauri Stolt, Helsinki (FI); Juhamatti Nikander, Hyvinkää (FI)

(73) Assignee: KONE CORPORATION, Helsinki (FI)

( * ) Notice: Subject to any disclaimer, the term of this patent is extended or adjusted under 35 U.S.C. 154(b) by 1079 days.

(21) Appl. No.: 14/674,546

(22) Filed: Mar. 31, 2015

(65) Prior Publication Data

US 2015/0311814 A1    Oct. 29, 2015

(30) Foreign Application Priority Data

Apr. 29, 2014   (EP) .................................... 14166319

(51) Int. Cl.
| | |
|---|---|
| H02M 5/458 | (2006.01) |
| H02M 1/36 | (2007.01) |
| H02M 7/12 | (2006.01) |

(52) U.S. Cl.
CPC ............. H02M 5/458 (2013.01); H02M 1/36 (2013.01); H02M 5/4585 (2013.01); H02M 7/125 (2013.01)

(58) Field of Classification Search
CPC ........ H02M 1/36; H02M 5/40–5/4585; H02M 7/155–7/28
See application file for complete search history.

(56) References Cited

U.S. PATENT DOCUMENTS

| | | | | |
|---|---|---|---|---|
| 6,329,636 | B1* | 12/2001 | Geissler | B23K 9/1006 |
| | | | | 219/130.1 |
| 2005/0122752 | A1 | 6/2005 | Schnetzka | |
| 2005/0213357 | A1* | 9/2005 | Paatero | H02M 5/458 |
| | | | | 363/95 |
| 2006/0208685 | A1* | 9/2006 | Schnetzka | H02H 9/001 |
| | | | | 318/800 |
| 2010/0085019 | A1* | 4/2010 | Masuda | H02J 7/1453 |
| | | | | 320/152 |

(Continued)

FOREIGN PATENT DOCUMENTS

| | | |
|---|---|---|
| CN | 101160701 A | 4/2008 |
| CN | 102130616 A | 7/2011 |

(Continued)

OTHER PUBLICATIONS

Chapman, Steven. Electric Machinery Fundamentals. McGraw Hill. $4^{th}$ Edition. Capter 7, pp. 380-472.*

(Continued)

*Primary Examiner* — Thienvu V Tran
*Assistant Examiner* — Peter M Novak
(74) *Attorney, Agent, or Firm* — Birch, Stewart, Kolasch & Birch, LLP

(57) ABSTRACT

The invention is related to a method of initiating a regenerative converter (1) and corresponding converter (1) including a line bridge (2) and a machine bridge (3), which are interconnected via a DC intermediate circuit (8A, 8B). The method comprises charging, through the line bridge (2) and while the machine bridge (3) remains inactive, the DC intermediate circuit (8A, 8B) to a target voltage (14) higher than peak value of the mains voltage (13).

18 Claims, 2 Drawing Sheets

(56) References Cited

U.S. PATENT DOCUMENTS

| 2012/0314461 | A1 | 12/2012 | Yoshikawa et al. | |
|---|---|---|---|---|
| 2015/0069841 | A1* | 3/2015 | Falk ........................ | H02J 3/383 |
| | | | | 307/63 |
| 2015/0078043 | A1* | 3/2015 | Harkin .................... | H02M 1/10 |
| | | | | 363/37 |

FOREIGN PATENT DOCUMENTS

| EP | 2439839 A1 | 4/2012 |
|---|---|---|
| EP | 2030313 B1 | 5/2012 |
| WO | WO 2006/093647 A1 | 9/2006 |

OTHER PUBLICATIONS

Office Action issued in copending Chinese Application No. 201510204475.7 dated Nov. 23, 2018.

\* cited by examiner

METHOD OF INITIATING A REGENERATIVE CONVERTER AND A REGENERATIVE CONVERTER

FIELD OF THE INVENTION

The invention relates to regenerative electric converters, which can be used for supplying electrical power in elevator systems, for example.

BACKGROUND OF THE INVENTION

Electric drive of an elevator may include a hoisting machine for driving an elevator car and an electric converter for controlling the hoisting machine. Hoisting machine may include a DC electric motor or an AC electric motor, such as an induction motor, permanent magnet synchronous motor, reluctance motor, or corresponding. A converter, such as AC/DC converter or frequency converter supplies current to the electric motor to produce desired movement of the elevator car.

Depending on running direction and load of the elevator car, electric motor of the hoisting machine may either turn electrical power into mechanical energy for moving elevator car or renegerate mechanical energy back into electricity by braking elevator car movement.

In past the electricity regenerated was usually consumed into heat in a separate power resistor, which had the effect that energy efficiency was somewhat compromised. Nowadays, however, regenerative converters are used. Regenerative converter means a power converter capable of feeding electrical power between electric machine and mains in two opposite directions, that is to feed electrical power from regenerating elevator hoisting machine back to the mains also.

In some embodiments, the regenerative converter includes a line bridge and a machine bridge, which are connected together via DC intermediate circuit busbars. Line bridge AC output terminals are connected to the mains, and machine bridge output terminals are connected to the windings of an electric machine. Frequency converter has an inverter with AC output terminals coupled to the windings of AC motor or generator, whereas AC/DC converter has a H-bridge with DC output terminals coupled to the windings of a DC motor or generator.

Both line bridge and machine bridge comprise solid state switches arranged as legs. The solid state switches may be igbt transistors, mosfet transistors, or corresponding. Each leg is associated with one of the output terminals of the corresponding line bridge/machine bridge. Each leg comprises a high-side and a low-side solid state switch connected in series between the high-voltage and low-voltage DC intermediate circuit busbars, and the output terminal is connected to the connection point of the high-side and low side switches. When the high-side and the low-side switch of the leg are switched alternatively at a selected modulation frequency, for example, between 3 kHz and 20 kHz, an adjustable output voltage is formed in the corresponding output terminal. Modulation method used may be PWM (pulse width modulation) or space vector modulation, for example.

An additional line current filter is further connected between power line of the mains and AC terminals of the line bridge to remove the current ripple, which is a result of switching the high-side and low-side switches of the line bridge.

In the control loop of the line bridge, DC voltage between the high-voltage and low-voltage DC intermediate circuit busbars is regulated to a target DC value by controlling current in the power lines coming from mains. Therefore powerline currents and voltages are measured with a high-accuracy feedback channel.

SUMMARY OF THE INVENTION

A regenerative converter may generate very high startup currents from the mains in a startup situation, especially when the power line impedance from the mains is small. One reason for this is that the modulated voltage in AC terminals of the line bridge is not always correct. Sometimes the wrong AC terminal voltage is a result of voltage losses across line bridge components. Sometimes the reason may be the blanking times needed to avoid cross-conduction between the high-side and low-side line bridge switches. On the other hand, the measurement errors in line bridge feedback channel may also cause unwanted peaks to the startup current.

The object of the invention is to solve at least some of the above-identified problems. This object is achieved with a method according to claim 1 and a regenerative converter according to claim 7.

Some preferred embodiments of the invention are described in the dependent claims.

An aspect of the invention is a method of initiating a regenerative converter including a line bridge connected to the mains and a machine bridge connected to the windings of an electric machine, the line bridge and the machine bridge being interconnected via a DC intermediate circuit. The method comprises charging, through the line bridge and while the machine bridge remains inactive, the DC intermediate circuit to a target voltage higher than peak value of the mains voltage. In the disclosure the term "inactive machine bridge" refers to a situation wherein the machine bridge is not operating, that is the high-side and the low-side switches of the machine bridge are not switching. Further, in some embodiments, the term "inactive machine bridge" may also refer to a situation wherein only high-side or alternatively only low-side switches of the machine bridge are conducting. In such situation, referred to as a dynamic braking operation, power is not transferred from DC intermediate circuit to the electric machine. The term "mains voltage" refers in the disclosure to the voltage present in power lines connecting the regenerative converter to the mains; if the mains is separated from the converter with a transformer, then "mains voltage" means voltage in transformer secondary, which is connected to the converter supply cables.

The DC intermediate circuit preferably includes one or more capacitors connected in parallel with the DC intermediate circuit busbars. This can mean that the extra energy caused by high capacitor voltage can be utilized in starting normal converter operation.

Another aspect of the invention is a regenerative converter, comprising a line bridge for connecting to the mains, a machine bridge for connecting to the windings of an electric machine, a DC intermediate circuit connecting together the line bridge and the machine bridge, and a control coupled to both the line bridge and the machine bridge, the control being configured to cause, while the machine bridge remains inactive, the line bridge to charge the DC intermediate circuit to a target voltage higher than peak value of the mains voltage.

Therefore it is possible to initiate the converter by recharging the DC intermediate circuit with a substantially small current to a target voltage higher that the mains peak voltage, without needing very high-accuracy line voltage and line current measurements. After initiation, normal converter operation can be started without high startup currents, because saturation of the line bridge control loop has been eliminated by increasing the DC intermediate circuit voltage. Small startup current increases lifetime of the converter and ensures that no failures, such as fuse failures etc., take place when starting the converter operation. Further, less accurate and therefore more simple and less expensive measurement apparatus may be used for measuring line currents and voltages of the converter.

According to one or more embodiments, the converter includes line current filtering inductors arranged in series between line bridge AC output terminals and the mains. The method comprises charging the DC intermediate circuit by switching one or more of the low-side and/or the high-side switches of the line bridge with a preselected pulse pattern. According to one or more embodiments, the method comprises charging the DC intermediate circuit by switching only one or more of the low-side switches or alternatively only one or more of the high-side switches of the line bridge. This can mean that a voltage boost circuit is established from mains through the filtering inductors and line bridge to the DC intermediate circuit, and DC intermediate circuit can be charged with a substantially small current by switching the line bridge switch(es) of the boost circuit with the preselected pulse pattern. In some other embodiments, instead of a preselected pulse pattern a control loop is used to define the switching pattern for the subset of switches operating during the initiation of the converter.

According to one or more embodiments, the method comprises observing the DC intermediate circuit voltage, and starting normal converter operation when the DC intermediate circuit voltage reaches a threshold value. This can mean that normal converter operation can be started as soon as possible at the startup situation. The term "normal converter operation" means operating situation wherein both the line bridge and the machine bridge are operating and therefore power supply between mains and electrical machine takes place.

According to one or more embodiments, the regenerative converter includes line current filtering inductors arranged in series between the line bridge AC output terminals and the mains connection.

According to one or more embodiments, the control comprises a memory for storing a preselected pulse pattern of the control pulses for one or more of the low-side switches and/or high-side switches of the line bridge, and the control is configured to cause switching with the preselected pulse pattern of one or more of the low-side switches and/or high-side switches of the line bridge.

According to one or more embodiments, the line bridge comprises low-side and high-side switches arranged as legs, and the control is configured to cause the line bridge to charge the DC intermediate circuit by switching only subset (e.g. one or more but not all) of the said switches.

According to one or more embodiments, the control is configured to cause the line bridge to charge the DC intermediate circuit by switching only one or more of the low-side switches or alternatively only one or more of the high-side switches of the line bridge.

According to one or more embodiments, the control comprises a feedback channel for observing the DC intermediate circuit voltage, and the control is configured to start normal converter operation when the DC intermediate circuit reaches a threshold value.

According to one or more embodiments, the regenerative converter is a frequency converter.

The embodiments described hereinbefore may be used in any combination with each other, if not indicated otherwise. Several of at least two of the embodiments may be combined together to form a further embodiment. Any aspects of the invention may comprise at least one of the embodiments described hereinbefore.

The preceding summary, as well as the additional features and additional advantages of the invention presented below, will be better understood by the aid of the following description of some embodiments, said description not limiting the scope of application of the invention.

MORE DETAILED DESCRIPTION OF PREFERRED EMBODIMENTS OF THE INVENTION

Figure 1:
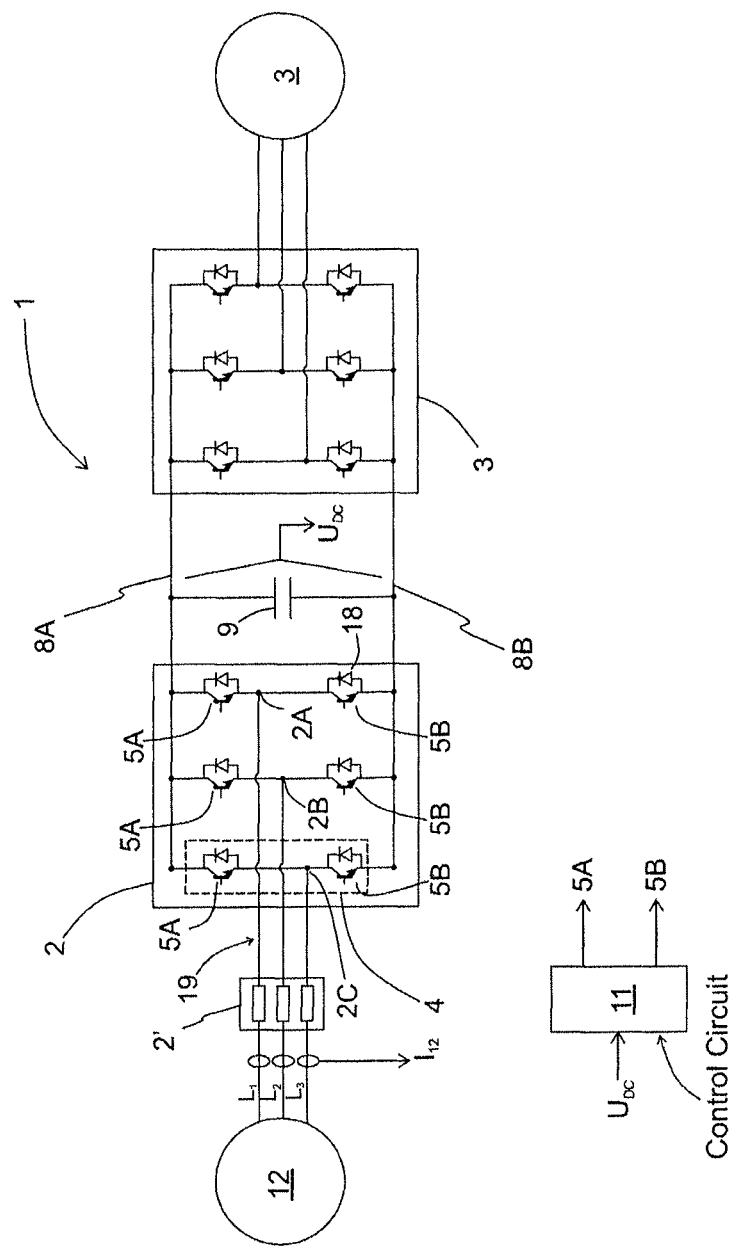
FIG. 1 represents schematic of a regenerative frequency converter according to an embodiment of the disclosure.
Figure 2A:
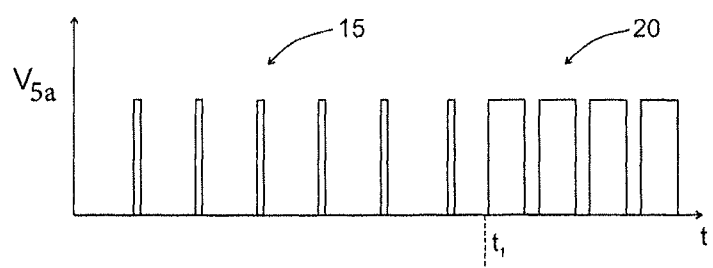
FIG. 2a represents switching pulse pattern of the line bridge high-side igbts of FIG. 1.
Figure 2B:
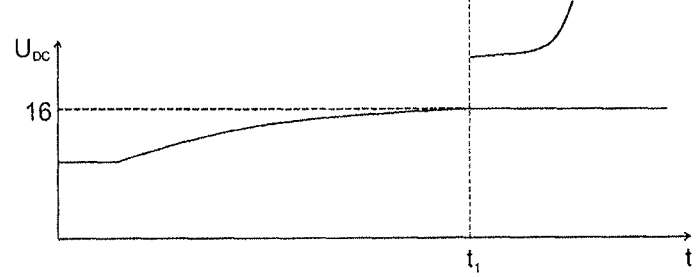
FIG. 2b represents DC link voltage graph when frequency converter of FIG. 1 is initiated.

For the sake of intelligibility, in FIGS. 1, 2a and 2b only those features are represented which are deemed necessary for understanding the invention. Therefore, for instance, certain components/functions which are widely known to be present in corresponding art may not be represented.

In the description same references are always used for same items.

FIG. 1 represents a regenerative frequency converter 1 of elevator hoisting machine. Hoisting machine includes a permanent magnet synchronous electric motor 10. In some other embodiments the hoisting machine may include an induction motor, reluctance motor, or even a DC motor, in which case instead of frequency converter 1 an AC/DC converter is used for supplying motor power. In the embodiment of FIG. 1, the frequency converter 1 supplies electrical power to the stator windings of the permanent magnet electric motor 10 to produce desired movement of the elevator car, as is known in the art.

Frequency converter 1 is a regenerative converter, which means it can supply power between the mains 12 and the motor 10 in two opposite directions, depending on the operation mode. When motor torque is applied in the direction of rotation of the motor 10 (driving mode), frequency converter supplies electrical power from mains 12 to the motor 10. Otherwise, when motor torque is applied in opposite direction (generator mode), frequency converter supplies electrical power from motor 10 back to the mains 12.

Frequency converter 1 includes a line bridge 2 and an inverter 3, which are connected together via high-voltage 8A and low-voltage 8B DC intermediate circuit busbars. The DC intermediate circuit 8A, 8B further comprises a capacitor 9 or a set of capacitors connected in parallel with the DC intermediate circuit busbars 8A, 8B for balancing the DC intermediate circuit voltage.

Line bridge 2 has similar topology with inverter 3, e.g. both have a 2-level inverter topology. In some other embodiments, line bridge 2 and/or inverter 3 may have a multi-level topology, for example, a 3-level inverter topology.

Line bridge 2 (and also inverter 3) has solid state switches 5A, 5B arranged as legs 4. The solid state switches 5A, 5B may be igbt transistors, mosfet transistors, or corresponding. In the frequency converter 1 of FIG. 1 igbt transistors are used. A rectifying diode 18 is connected antiparallel-wise with each igbt transistor 5A, 5B. Each leg 4 is associated with one of the output terminals 2A, 2B, 2C of line bridge 2 (and similarly of the inverter 3 is associated with the motor 10 terminals). Each leg 4 comprises a high-side 5A and a low-side 5B igbt transistor connected in series between the high-voltage 8A and low-voltage 8B DC intermediate circuit busbars. The output terminal 2A, 2B, 2C is connected to the connection point of the high-side 5A and low side 5B igbt transistors. In normal operation, the high-side 5A and the low-side 5B igbt transistors are switched alternatively at a selected modulation frequency, which is in this case 5 kHz. This way an adjustable output voltage is formed in each output terminal 2A, 2B, 2C. PWM (pulse width modulation) is used as a modulation method.

A line current filter 2' comprising coils is connected between phases L1, L2, L3 of the mains 12 and the output terminals 2A, 2B, 2C. Purpose of the line current filter 2' is to remove disturbance from the line current.

Further, a control circuit 11 is coupled to the control gates of the igbt transistors 5A, 5B. The control circuit may be implemented with any suitable processing and communication elements, such as microprocessors, microcontrollers, DSP processors, FPGA (field programmable gate arrays) circuits, memory circuits, analog and digital signal lines, data buses and data converters etc., as is known in the art.

This means that the control circuit 11 generates PWM control pulses during normal operation to both line bridge 2 and inverter 3 igbt transistors, causing stepless, controlled supply of power through the frequency converter 1.

The control circuit 11 has a control loop for controlling operation of the line bridge 2. In normal operation, line bridge 2 regulates DC intermediate circuit voltage $U_{DC}$ to a preselected target value of approximately 650 V. The term "DC intermediate circuit voltage $U_{DC}$" means voltage between high-voltage 8A and low-voltage 8B DC intermediate circuit busbars. $U_{DC}$ voltage regulation is done by controlling current in the supply cables 19 by adjusting voltages in the line bridge output terminals 2A, 2B, 2C as disclosed above. Control circuit 11 comprises also measurement amplifiers, which measure currents in supply cables 19 as well as DC intermediate circuit voltage $U_{DC}$.

In traditional solutions, at a startup situation the frequency converter 1 generates very high startup currents $I_{12}$ from the mains 12, because the control loop is saturated before starting of the operation. The reason for saturation is that DC intermediate circuit voltage $U_{DC}$ is smaller than mains voltage 12 before line bridge 2 starts operating. Before operation, voltage $U_{DC}$ is defined by rectification from mains 12 through diodes 18 and therefore voltage losses of the diodes 18 cause the $U_{DC}$ voltage drop. Still another reason for high startup current $I_{12}$ is that the modulated voltage in AC terminals 2A, 2B, 2C of the line bridge 2 is not always correct. Sometimes the wrong AC terminal 2A, 2B, 2C voltage is a result of voltage losses across line bridge components. Sometimes the reason may be the blanking times needed to avoid short-circuit between the high-side and low-side line bridge switches. Adopting the blanking times unintentionally diminishes AC terminal 2A, 2B, 2C voltages, especially in high switching frequencies. On the other hand, the measurement errors in line bridge feedback channel may also cause unwanted peaks to the startup current. It is the control loop that normally corrects these errors, but only after operation has been started. High startup currents $I_{12}$ are especially present in installations having low power line impedance from the mains.

For resolving the above-identified startup-current problem, the control 11 has a special initiation mode, which charges the DC intermediate circuit voltage $U_{DC}$ to a target value higher than the mains voltage peak value before starting normal frequency converter operation. The term "peak value of the mains 12 voltage" means amplitude of the phase to phase voltage in the power line cables coming from mains 12 to the frequency converter 1, that is, the amplitude of the voltage between any of the phases L1, L2, L3. In the initiation mode, only a subset of the line bridge igbt transistors 5A, 5B is switched and with a dedicated pulse pattern that causes a substantially small charging current to flow from the mains through the line bridge to the DC intermediate circuit capacitor 9. Basically switching only one of the transistors 5A, 5B is enough for charging the capacitor 9; however in this embodiment all the high-side transistors 5A are switched while the low-side transistors 5B remain inactive.

Looking at FIG. 1, a voltage boost circuit is established from mains 12 through the inductors 2' and the high-side transistors 5A of the line bridge 2 to the DC intermediate circuit capacitor 9. When transistors 5A are switched, voltage in the DC intermediate circuit busbar 8A can rise higher than peak value of the mains 12 voltage due to the voltage induced in coils 2'. Correspondingly, voltage in the DC intermediate circuit busbar 8B becomes smaller that minimum value of the mains 12 voltage. High-side transistors 5A are switched simultaneously with a preselected pulse pattern 15, which is memorized in control circuit 11. This means that only the high-side transistors 5A are switches while low-side transistors 5B remain inactive. In the pulse pattern 15, only very narrow control pulses 15 are used to reduce the startup current $I_{12}$, as represented in FIG. 2a. Switching of the transistors 5A causes the DC intermediate circuit voltage $U_{DC}$ to rise gradually, as represented in FIG. 2b.

Control circuit 11 measures DC link voltage $U_{DC}$ and compares the measured voltage $U_{DC}$ to a threshold value 16. Threshold value may be substantially same as the DC link voltage during normal operation. At time $t_1$ the control circuit 11 recognizes that the measured DC intermediate circuit voltage $U_{DC}$ has reached the threshold value 16, and it starts normal operation by starting the line bridge 2 control loop and starting inverter 3 operation. At this point all the high-side 5A and low-side 5B transistors of line bridge 2 start switching with a pulse pattern 20 continuously redefined by the line bridge 2 control loop. Because the measured DC intermediate voltage $U_{DC}$ is now substantially same as the normal operation voltage (e.g. line bridge 2 control loop target value), line bridge 2 control loop may be started without high startup currents $I_{12}$.

In the above embodiments the frequency converter 1 was represented as a part of an elevator installation. A skilled person understands, however, that the frequency converter disclosed may also have other applications, for example, in electrical drives of escalators, moving walkways, electric cars, wind power plants, photovoltaic energy supplies etc.

While the present inventions have been described in connection with a number of exemplary embodiments, and implementations, the present inventions are not so limited, but rather cover various modifications, and equivalent arrangements, which fall within the purview of prospective claims.

The invention claimed is:

1. A method of driving a regenerative converter including a line bridge connected to an A.C. main power supply to receive an A.C. mains voltage and a machine bridge interconnected via a DC intermediate circuit, the machine bridge being connected to drive an electric machine having windings, the method comprising:
   charging, through the line bridge and while the machine bridge remains inactive, the DC intermediate circuit to a target voltage higher than peak value of the mains voltage: and
   thereafter, using the target voltage to provide a higher startup voltage to the electric machine through said machine bridge to facilitate start of the electric machine with the higher startup voltage.

2. The method according to claim 1, the method comprising:
   observing the DC intermediate circuit voltage
   starting normal converter operation when the DC intermediate circuit voltage reaches a threshold value.

3. The method according to claim 1 wherein the electric machine is an A.C. motor and wherein the machine bridge supplies A.C. power thereto.

4. The method according to claim 1, wherein the converter includes line current filtering inductors arranged in series between line bridge AC output terminals and the main power supply.

5. The method according to claim 4, the method comprising:
   observing the DC intermediate circuit voltage
   starting normal converter operation when the DC intermediate circuit voltage reaches a threshold value.

6. The method according to claim 4, the method comprising:
   charging the DC intermediate circuit by switching one or more of the low-side and/or the high-side switches of the line bridge with a preselected pulse pattern.

7. The method according to claim 6, the method comprising:
   observing the DC intermediate circuit voltage
   starting normal converter operation when the DC intermediate circuit voltage reaches a threshold value.

8. The method according to claim 4 or 6, the method comprising:
   charging the DC intermediate circuit by switching only subset of the switches of the line bridge.

9. The method according to claim 8, the method comprising:
   observing the DC intermediate circuit voltage
   starting normal converter operation when the DC intermediate circuit voltage reaches a threshold value.

10. The method according to claim 8, the method comprising:
    charging the DC intermediate circuit by switching only one or more of the low-side switches or alternatively only one or more of the high-side switches of the line bridge.

11. A regenerative converter providing power from power mains of an A.C. power supply to an electric machine having windings, comprising:
    a line bridge for connecting to the power mains;
    a machine bridge for connecting to the windings of the electric machine;
    a DC intermediate circuit connecting the line bridge and the machine bridge together;
    a control coupled to both the line bridge and the machine bridge, the control being configured to:
    cause, while the machine bridge remains inactive, the line bridge to charge the DC intermediate circuit to a target voltage higher than peak value of the voltage of the power mains.

12. The regenerative converter according to claim 11, wherein the control comprises a feedback channel for observing the DC intermediate circuit voltage,
    and wherein the control is configured to start normal converter operation when the DC intermediate circuit reaches a threshold value.

13. The regenerative converter according to claim 11, wherein the regenerative converter is a frequency converter.

14. The regenerative converter according to claim 11, wherein the converter includes line current filtering inductors arranged in series between the line bridge AC output terminals and the power mains.

15. The regenerative converter according to claim 14, wherein the control comprises a memory for storing a preselected pulse pattern of the control pulses for one or more of the low-side switches and/or high-side switches of the line bridge;
    and wherein the control is configured to cause switching with the preselected pulse pattern of one or more of the low-side switches and/or high-side switches of the line bridge.

16. The converter according to claim 15 wherein the electric machine is an A.C. motor and wherein the machine bridge supplies A.C. power thereto.

17. The regenerative converter according to claim 14 or 15, wherein the line bridge comprises low-side and high-side switches arranged as legs, and wherein the control is configured to cause the line bridge to charge the DC intermediate circuit by switching only subset of the switches.

18. The regenerative converter according to claim 17, wherein the control is configured to cause the line bridge to charge the DC intermediate circuit by switching only one or more of the low-side switches or alternatively only one or more of the high-side switches of the line bridge.

* * * * *